United States Patent
Masunaga et al.

[11] 3,720,589
[45] March 13, 1973

[54] METHOD OF FORMING A HEAT RESISTANT FILM

[75] Inventors: Kunihiko Masunaga; Hiroshi Shinohara; Toshihito Kondo, all of Toyota-shi, Japan

[73] Assignee: Toyota Jidosha Kogyo Kabushiki Kaisha, Toyota-shi, Japan

[22] Filed: Aug. 6, 1971

[21] Appl. No.: 169,721

[30] Foreign Application Priority Data

Aug. 17, 1970 Japan ..................................45/71602

[52] U.S. Cl. ................204/14 N, 204/56 R, 204/181
[51] Int. Cl. ...........C23b 5/00, C23b 9/00, B01k 5/00
[58] Field of Search ....................204/14 N, 56 R, 181

[56] References Cited

UNITED STATES PATENTS

| | | | |
|---|---|---|---|
| 3,175,964 | 3/1965 | Watanable et al. | 204/56 R |
| 3,546,016 | 12/1970 | Pavelich et al. | 204/56 R |
| 3,663,484 | 5/1972 | Broecker | 204/181 |
| 3,663,487 | 5/1972 | Broecker | 204/181 |

Primary Examiner—John H. Mack
Assistant Examiner—T. Tufariello
Attorney—Arthur G. Connolly et al.

[57] ABSTRACT

A method of forming a highly heat-resistant polymer film on an object surface by electrolyzing a vinyl monomer and a $\alpha,\alpha'$-derivative salt of p-xylylene without use of any supporting electrolyte and with the object taken as one of the electrodes.

8 Claims, 2 Drawing Figures

3,720,589

METHOD OF FORMING A HEAT RESISTANT FILM

BACKGROUND OF THE INVENTION

The present invention relates to a method of forming a heat-resistant film on an object.

Conventional methods available for the formation of a vinyl polymer film are electrophoretic coating and electrolytic polymerization as well as the common coating with a brush or by spraying. The films obtained by these methods, however, are not always sufficiently heat-resistant.

In the Journal of Applied Polymer Science, Vol. 11, page 1209 (1967) Sidney et al. disclose a method of forming a polyparaxylylene film on the aluminum electrode by electrolyzing a $\alpha,\alpha'$-derivative salt of p-xylylene in a polar solvent. It has been known that polyparaxylylene is highly heat-resistant and not soluble in any solvent at less than 300°C., but the polyparaxylylene film obtained by the above method is found unsuitable for practical use because it possesses poor adhesion and lacks smoothness.

Meanwhile, there is a method of electrolytically polymerizing only a vinyl monomer. According to this method, the electroconductivity is enhanced by the addition of sodium nitrate, lithium nitrate or McKee's salt. These additives, however, are not consumed essentially in electrolytic polymerization. Instead they remain in the bath thereby making the obtained film uneven or reducing the anti-corrosiveness of the film by admixing some salt into the film.

SUMMARY OF THE INVENTION

The present invention relates to a method of forming a highly heat-resistant polymer film on an object surface by electrolyzing a vinyl monomer and a $\alpha,\alpha'$-derivative salt of p-xylylene in a polar solvent without use of any supporting electrolyte and with the object taken as one of the electrodes.

It is an object of the present invention to provide a method of forming a highly adhesive, smooth, heat-resistant and insoluble copolymer film on an object surface.

Another object of the present invention is to provide a method of forming on a surface to be coated a film free from deterioration due to admixing a supporting electrolyte.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

According to the present invention, a solution is obtained by compounding a mixture of a vinyl monomer and a $\alpha,\alpha'$-derivative salt of p-xylylene with a polar organic solvent. Direct current is conducted through this solution with an object to be coated as one of the electrodes whereby a copolymer film of the vinyl monomer and the p-xylylene is formed on the surface of the object.

Vinyl monomers most suitable for the present invention are styrene and $\alpha$-methylstyrene. Other monomers available include: methyl methacrylate, acrylonitrile, methacrylonitrile, glycidyl acrylate, glycidyl methacrylate, acrylamide, acrolein, methyl vinyl keton, n-butyl vinyl ether, vinyl acetate, vinyltoluene, N,N'-methylenebisacrylamide, divinyl sulfone, divinylbenzene, ethyleneglycol dimethacrylate, and butadiene. Meanwhile, p-xylylene-bis-trimethylammonium nitrate is found the best as the $\alpha,\alpha'$-derivative salt of p-xylylene, but the following are also available: p-xylylene-bis-triphenylphosphonium chloride, 2,3,5,6-tetrachloro-p-xylylene-bis-trimethyl-ammonium nitrate. The best solvent to be used is dimethylsulfoxide or dimethylformamide, but the following polar solvents are also available: acetonitrile, pyridine, formamide, dimethylacetamide, nitrobenzene.

Figure 2:
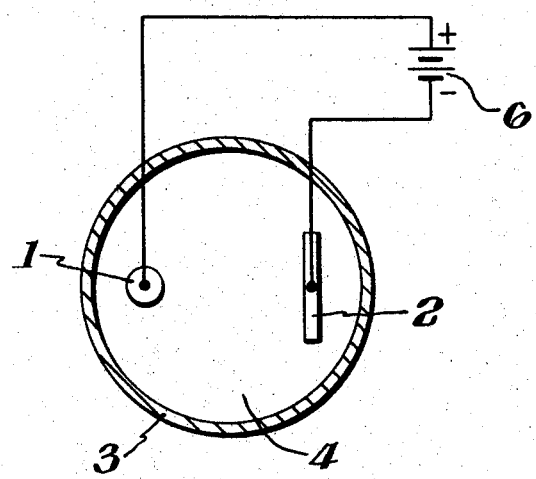
FIG. 2 is a cross sectional plan view of the apparatus of FIG. 1.
Figure 1:
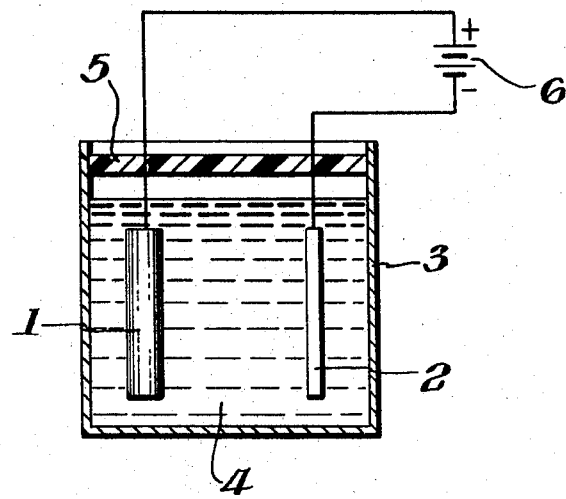
FIG. 1 is a schematic diagram showing the apparatus to be used in forming a film according to the present invention.

Next referring to the drawing, the present invention is described as follows. FIG. 1 is a schematic diagram showing the apparatus to be used according to this invention, and FIG. 2 is a plan view of the apparatus. In the drawing, reference numerals 1 and 2 represent an electrode and an object to be coated, respectively. An electrolytic bath 3 contains a mixture 4 of a vinyl monomer and a p-xylylene derivative. The bath is covered by a lid 5, and a direct current source 6 is provided as shown.

In the formation of a film, first a mixture 4 composed of 10–60 parts of a vinylmonomer and 1–10 parts of a $\alpha,\alpha'$-derivative salt of p-xylylene, per 100 parts of polar organic solvent (hereinafter parts are invariably volume parts) is poured into the bath 3. The electrode 1 and the object to be coated 2 are placed in the bath, and direct current is then conducted through the mixture 4 with the electrode 1 and the object 2 as respective poles. A copolymer film of the vinyl monomer and the p-xylylene is thereby formed on the surface of the object 2.

It is recommended that the process of electrolytic polymerization be carried out in a nitrogen gas stream or bubbling with nitrogen blasted into the mixture 4 at ordinary temperature. Alternatively, the process may be carried out in the temperature range between the freezing point and the boiling point of the solvent in the atmosphere. The appropriate current density is 2–40mA/cm² and the current conducting time should be varied depending on the types of monomers and solvent. Upon completion of polymerization, the film is washed with water and dried at ordinary temperature. Also, the drying may be done by heating.

According to the present invention, a $\alpha,\alpha'$-derivative salt of p-xylylene is used as the monomer to form a film, and at the same time serve as the supporting electrolyte. Therefore, unlike conventional methods, the present invention does not require the addition of a supporting electrolyte for polymerization. Thus, there is no likelihood of the supporting electrolyte contaminating the film and deteriorating it as is apt to happen in the conventional methods.

The $\alpha,\alpha'$-derivative salt of p-xylylene is a very expensive material, but copolymerization of it with a vinyl monomer produces an inexpensive film. Moreover, the polyparaxylylene film obtained through electrolytic polymerization, which is originally lacking in adhesion and smoothness, becomes a copolymer film superior in adhesion, smoothness, heat resistance and insolubility, when it is copolymerized with an appropriate amount of a vinyl monomer.

The above mentioned advantages of the present invention are further enhanced if one or more of the vinyl monomers and the p-xylylene derivative salts are properly mixed in a suitable proportion.

The following data involves several references and examples according to the present invention.

Reference 1:
| | |
|---|---|
| Styrene | 40 g |
| Dimethylformamide | 60 g |
| Tetraethylammonium chloride | 2 g |

With a mixture of the above composition and a carbon rod as the anode and an aluminum plate as the cathode, direct current with a density of $10mA/cm^2$ was conducted for 10 minutes in a 25°C. bubbling with nitrogen and as a result a white polystyrene film was formed on the aluminum plate. The film had a low molecular weight and poor adhesion, and when heated over 80°C., it melted whereby it was not resistant to heat.

Reference 2:
| | |
|---|---|
| p-xylylene-bis-trimethyl-ammonium nitrate | 3.2 g |
| Dimethylsulfoxide | 96 g |

With a mixture of the above composition and a platinum plate as the anode and an aluminum plate as the cathode, direct current with a density of $10mA/cm^2$ was conducted for 5 minutes in a 25°C. bubbling with nitrogen and as a result a white, highly heat resistant film was formed on the aluminum plate, but this film lacked in adhesion and flexibility.

EXAMPLE 1

The mixture of Reference 1 with the supporting electrolyte eliminated and a $\alpha,\alpha'$-derivative salt of p-xylylene added of the following composition:

| | |
|---|---|
| Styrene | 20 g |
| p-xylylene-bis-triphenyl phosphonium bromide | 3 g |
| Dimethylsulfoxide | 80 g | was used with a platinum plate as the anode and an aluminum plate as the cathode. In a 25°C. bubbling with nitrogen direct current with a density of $10mA/cm^2$ was conducted through the mixture for 5 minutes, and a highly adhesive smooth, whitish green film was formed on the aluminum plate. The film was washed with water and dried. The film thus obtained proved highly heat-resistant, not being melted even by heating.

Example 2:
| | |
|---|---|
| Styrene | 20 g |
| p-xylylene-bis-triphenyl phosphonium bromide | 3 g |
| Dimethylsulfoxide | 80 g |

With a mixture of the above composition and a platinum plate as the anode and an aluminum plate as the cathode, direct current with a constant voltage of 60V was conducted for 2 minutes in a 25°C. bubbling with nitrogen and as a result a highly adhesive, smooth, heat-resistant film was formed on the aluminum plate.

Example 3:
| | |
|---|---|
| α- methylstyrene | 15 g |
| p-xylylene-bis-trimethyl-ammonium nitrate | 3.2 g |
| Dimethylsulfoxide | 85 g |

With a mixture of the above composition and a platinum plate as the anode and an aluminum plate as the cathode, direct current with a density of $10mA/cm^2$ was conducted for 5 minutes in a 25°C. bubbling with nitrogen and as a result a highly adhesive, smooth and whitish green film was formed on the aluminum plate. After washing with water and drying, the film was a highly heat-resistant film, not being melted even by heating up to 250°C.

Example 4:
| | |
|---|---|
| Methyl methacrylate | 25 g |
| p-xylylene-bis-triphenyl phosphonium bromide | 3 g |
| Dimethylformamide | 72 g |

With a mixture of the above composition and a platinum plate as the anode and an iron plate as the cathode, direct current with a density of $10mA/cm^2$ was conducted for 5 minutes at a mixture temperature of 25°C., and as a result a smooth, white film was formed on the iron plate cathode. After washing with water and drying, the obtained film exhibited good heat-resistance.

Example 5:
| | |
|---|---|
| Methacrylonitril | 20 g |
| p-xylylene-bis-trimethyl-ammonium nitrate | 3.2 g |
| Dimethylacetamide | 80 g |

With a mixture of the above composition and a platinum plate as the anode and a copper plate as the cathode, direct current with a density of $10mA/cm^2$ was conducted for 4 minutes at a mixture temperature of 25°C., and as a result a film with good heat-resistance was formed on the copper plate cathode.

Example 6:
| | |
|---|---|
| Glycidyl methacrylonitril | 15 g |
| p-xylylene-bis-trimethyl-ammonium nitrate | 3.2 g |
| Dimethylformamide | 85 g |

With a mixture of the above composition and a platinum plate as the anode and an aluminum plate as the cathode, direct current with a density of $10mA/cm^2$ was conducted for 5 minutes in a 25°C. bubbling with nitrogen and as a result a highly adhesive, smooth, translucent film was formed on the aluminum plate cathode. After washing with water and drying at 100°C. for 20 minutes, a hardly hard, heat-resistant film was obtained.

Example 7:
| | |
|---|---|
| Methyl vinyl keton | 20 g |
| p-xylylene-bis-trimethyl-ammonium nitrate | 3.2 g |
| Dimethylacetamide | 80 g |

With a mixture of the above composition and a platinum plate as the anode and an aluminum plate as the cathode, direct current with a density of 10mA/cm² was conducted for 5 minutes at a mixture temperature of 25°C., and as a result a whitish-green, heat-resistant film was formed on the aluminum plate.

To verify the effect of the present invention, a differential thermal analysis (DTA) and a thermogravimetric analysis (TGA) were carried out for the purpose of determining the heat resistances of the films obtained in the above references and examples. According to the results, all the films except the one in Reference 1 had no softening temperature and they were directly decomposed. From this it follows that the copolymer film is polymer with cross-linked structure.

Meanwhile, the film adhesions were compared by a checkered tape test and the results are tabulated below:

| Method      | Decomposition temperature (°C) | cross-hatching test (adhesive tape test) |
|-------------|-------------------------------|------------------------------------------|
| Reference 1 | 80 (softening)                | 13/100                                   |
| "         2 | 480                           | 52/100                                   |
| Example   1 | 420                           | 100/100                                  |
| "         2 | 420                           | 100/100                                  |
| "         3 | 460                           | 100/100                                  |
| "         4 | 430                           | 90/100                                   |
| "         5 | 450                           | 100/100                                  |
| "         6 | 425                           | 100/100                                  |
| "         7 | 440                           | 90/100                                   |

* The method of test is relied on JIS–K–5400

What is claimed is:

1. A method of forming a heat-resistant film by electrolytic polymerization characterized by compounding a mixture of vinyl monomer and a $\alpha,\alpha'$-derivative salt of p-xylylene with a polar organic solvent, taking an object to be coated and positioning it as one of the poles, conducting a direct current through the mixture thus compounded and thereby forming a copolymer film of the vinyl monomer and the p-xylylene on the surface of the object.

2. A method of forming a heat-resistant film by electrolytic polymerization as in claim 1 wherein 10-60 parts of the vinyl monomer and the $\alpha,\alpha'$-derivative salt of 1-10 parts of p-xylylene are mixed with 100 parts by volume of the polar organic solvent.

3. A method of forming a heat-resistant film by electrolytic polymerization as in claim 1 wherein the vinyl monomer is selected from sytrene, $\alpha$-methylstyrene, methyl methacrylate, acrylonitrile, methacrylonitrile, or butadiene.

4. A method of forming a heat-resistant film by electrolytic polymerization as in claim 1 wherein the $\alpha,\alpha'$-derivative salt of p-xylylene is selected from p-xylylene-bis-trimethyl ammonium nitrate, p-xylylene-bis-triphenyl phosphonium chloride, or 2,3,5,6-tetrachloro-p-xylylene-bis-trimethylammonium nitrate.

5. A method of forming a heat-resistant film by electrolytic polymerization as in claim 1 wherein the solvent is a polar solvent selected from dimethylsulfoxide, dimethylformamide, acetonitrile, pyridine, formamide, dimethylacetamide, or nitrobenzene.

6. A method of forming a heat-resistant film by electrolytic polymerization as in claim 1 wherein the electrolytic polymerization takes place at ordinary temperature bubbling with nitrogen.

7. A method of forming a heat-resistant film by electrolytic polymerization as in claim 1 wherein the electrolytic polymerization takes place at ordinary temperature with nitrogen gas blasted into the mixture.

8. A method of forming a heat-resistant film by electrolytic polymerization as in claim 1 wherein the electrolytic polymerization takes place at a current density of 2-40mA/cm².

* * * * *